United States Patent
Huang et al.

(10) Patent No.: US 9,117,079 B1
(45) Date of Patent: Aug. 25, 2015

(54) MULTIPLE APPLICATION VERSIONS IN A SINGLE VIRTUAL MACHINE

(71) Applicants: Ben Huang, Nanjing (CN); Xiaochuan Wan, Nanjing (CN); Xinfeng Liu, Nanjing (CN); Qiang Huang, Nanjing (CN)

(72) Inventors: Ben Huang, Nanjing (CN); Xiaochuan Wan, Nanjing (CN); Xinfeng Liu, Nanjing (CN); Qiang Huang, Nanjing (CN)

(73) Assignee: Trend Micro Inc., Tokyo (JP)

( * ) Notice: Subject to any disclaimer, the term of this patent is extended or adjusted under 35 U.S.C. 154(b) by 62 days.

(21) Appl. No.: 13/770,554

(22) Filed: Feb. 19, 2013

(51) Int. Cl.
 *G06F 21/00* (2013.01)
 *G06F 21/56* (2013.01)
 *G06F 9/445* (2006.01)

(52) U.S. Cl.
 CPC .............. *G06F 21/566* (2013.01); *G06F 21/56* (2013.01); *G06F 21/565* (2013.01); *G06F 8/61* (2013.01); *G06F 8/62* (2013.01)

(58) Field of Classification Search
 CPC ....... G06F 21/53; G06F 21/56; G06F 21/565; G06F 21/566; G06F 8/61; G06F 8/62
 USPC ..................................................... 726/22–26
 See application file for complete search history.

(56) References Cited

U.S. PATENT DOCUMENTS

| | | | | |
|---|---|---|---|---|
| 7,774,369 B2 * | 8/2010 | Herzog et al. | ................ | 707/793 |
| 7,865,441 B2 * | 1/2011 | Boctor et al. | ................... | 705/57 |
| 2004/0268361 A1 * | 12/2004 | Schaefer | ....................... | 719/310 |
| 2005/0107157 A1 * | 5/2005 | Wachtfogel et al. | ............ | 463/29 |
| 2005/0257266 A1 * | 11/2005 | Cook et al. | ........................ | 726/23 |
| 2006/0075381 A1 * | 4/2006 | Laborczfalvi et al. | ........ | 717/100 |
| 2006/0085860 A1 * | 4/2006 | Zou et al. | ........................ | 726/26 |
| 2006/0184838 A1 * | 8/2006 | Singonahalli et al. | .......... | 714/45 |
| 2007/0067321 A1 * | 3/2007 | Bissett et al. | ................. | 707/100 |
| 2008/0127348 A1 * | 5/2008 | Largman et al. | ................. | 726/24 |
| 2009/0007139 A1 * | 1/2009 | Jacobson et al. | ............. | 719/313 |
| 2009/0069906 A1 * | 3/2009 | Norberg et al. | .................. | 700/81 |
| 2009/0271775 A1 * | 10/2009 | Barsness et al. | ............. | 717/151 |
| 2012/0216046 A1 * | 8/2012 | McDougal et al. | ........... | 713/183 |

* cited by examiner

*Primary Examiner* — Harunur Rashid
*Assistant Examiner* — Sher Khan
(74) *Attorney, Agent, or Firm* — Beyer Law Group LLP (57) ABSTRACT

A single virtual machine is implemented upon a computer and an operating system executes within this virtual machine. A sample file suspected of being malware is received and any number of versions of the software application corresponding to the sample file are installed. Each version of the software application is executed within the operating system, each version opening the sample file. Behavior of each version and of the sample file is collected while each version is executing. A score indicating malicious behavior for each version with respect to the sample file is determined and reported. The versions may execute serially in the happening system, each version terminating before the next version begins executing. Or, all versions may execute concurrently within the operating system. Files and registries are hidden to facilitate installation. System information is changed to facilitate execution.

22 Claims, 6 Drawing Sheets

MULTIPLE APPLICATION VERSIONS IN A SINGLE VIRTUAL MACHINE

FIELD OF THE INVENTION

The present invention relates generally to detection of malware upon a computer. More specifically, the present invention relates to executing multiple versions of a software application in a single virtual machine in order to detect malware.

BACKGROUND OF THE INVENTION

Currently, malicious software targets computers worldwide and antivirus service providers are constantly developing new techniques in order to combat new threats. Often, vulnerabilities exist in particular software applications such as word processing applications, spreadsheets, document readers and writers, etc. Malware is able to target these software applications and take advantage of these vulnerabilities. Moreover, there may be different vulnerabilities in different versions of these applications, and antivirus service providers need to be able to protect all of these different versions from attack, and need to be able to detect malware occurring in all of these different versions.

In the prior art, antivirus products use multiple virtual machines on a single computer in order to be able to execute all of the different versions of a particular software application in order to detect malicious behavior in all of the versions. Unfortunately, multiple virtual machines require more resources (including CPU time, memory and disk) and require more management time (installation, configuration, etc.). If the software application includes many different versions, often this multiple virtual machine approach ignores certain versions due to resource limitations, resulting in a decrease in the malware detection rate.

Accordingly, a new approach is desired that is able to detect malicious behavior in many different versions of a software application without the drawbacks associated with the prior art.

SUMMARY OF THE INVENTION

To achieve the foregoing, and in accordance with the purpose of the present invention, a technique is disclosed that is able to use only a single virtual machine in order to execute multiple versions of a particular software application.

In a first embodiment, a single virtual machine is implemented upon a computer. An operating system begins executing within this virtual machine. A sample file that is suspected of being malware is received within the operating system and any number of versions of the software application corresponding to the sample file are installed. Next, each version of the software application is executed within the operating system, each version opening the sample file. Behavior of each version and of the sample file is collected while each version is executing.

A second embodiment is similar to the first embodiment although in the second embodiment each version of the application program is executed serially. An executing version will terminate before the next version begins execution.

A third embodiment is similar to the first embodiment although in the third embodiment each version of the application program executes concurrently with the other versions. At a single point in time, all versions will be executing.

By using only a single virtual machine, the present invention is also able to reduce the time needed to install and execute many different versions of a particular software application. Further, all versions of the software application can be tested with a particular sample file in order to determine whether or not the sample file is malicious with respect to any of the versions.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

As mentioned above, malware may target different versions of a software application. Even though a vulnerability in a particular version may be fixed, malware may find a way around that fix in a new version, or may target a different vulnerability in the new version. For example, Java/CVE-2010-0094 is a family of malicious Java applets stored within a Java Archive file (.JAR) that attempts to exploit a vulnerability in the Java Runtime Environment (JRE) up to and including version 6. Similarly, the malware Java/CVE-2012-1723 only exists in Java version 7. In order to determine whether a given .JAR sample file is malicious or not, it is desirable to execute this sample file in different versions of Java because one does not know which vulnerability is likely to be attacked in which version. If the sample file is only executed in version 6 (for example), the ability of the sample file to attack a vulnerability in version 7 will not be detected. Accordingly, it is realized that it can be important to execute a sample file in different versions of a particular software application, particularly within a so-called "sandbox" environment.

And, as is known in the art, a virtual machine is a software implementation of a machine that is able to execute programs like a physical machine. A virtual machine is typically installed on top of the original operating system running on a computer. The virtual machine provides a complete system platform supporting the execution of a complete operating system. This operating system may simulate the original operating system or may emulate a different operating system (non-native operating system) or hardware environment. A virtual machine, though, is less efficient than the real machine, and when multiple virtual machines are concurrently running on the same physical computer, the speed of execution of each virtual machine can suffer or be unstable.

Nevertheless, many prior art "sandbox" environments utilize multiple virtual machines on a single computer in order to test a variety of malware samples.

Accordingly, it is realized that the ability to execute multiple versions of a particular software application on a single virtual machine is desirable in order to test malware samples in different versions.

Figure 1:
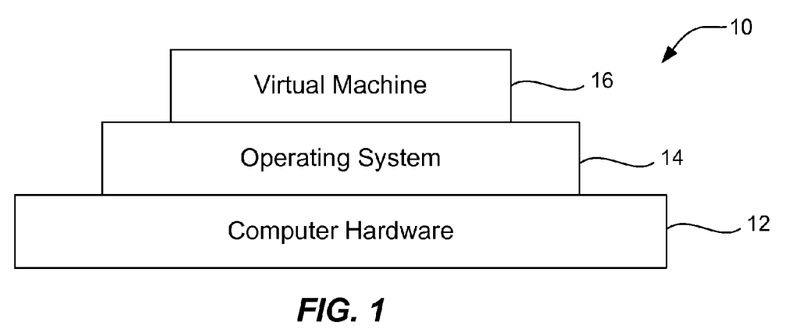
FIG. 1 illustrates a computing environment suitable for use with the present invention.

FIG. 1 illustrates a computing environment 10 suitable for use with the present invention. An operating system 14 executes upon computer hardware 12. The computer hardware may be any suitable computer such as a Dell R720 Server.

Installed upon the operating system is a single virtual machine 16 that simulates a hardware environment upon which an operating system may execute, and within which any number of versions of a variety of software applications may also execute. Some virtual machines are also capable of executing directly upon computer hardware 12.

Figure 2:
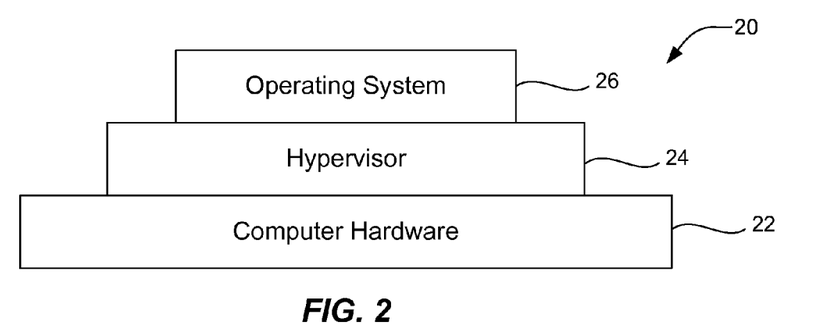
FIG. 2 illustrates another computing environment suitable for use with the present invention.

FIG. 2 illustrates another computing environment 20 suitable for use with the present invention. Shown is computer hardware 22 upon which software known as a hypervisor 24 is executing. As is known in the art, a hypervisor is typically computer software that creates and runs any number of virtual machines, and is also referred to as a virtual machine manager. The hypervisor presents to each virtual machine a virtual operating platform and manages the execution of the guest operating systems running on the virtual machines. Hypervisor 24 is known as a type I (or native) hypervisor in that it runs directly on the computer hardware in order to manage any number of virtual machines termed "guest machines". In this example, a single guest operating system 26 is executing upon a single virtual machine managed by hypervisor 24.

Figure 3:
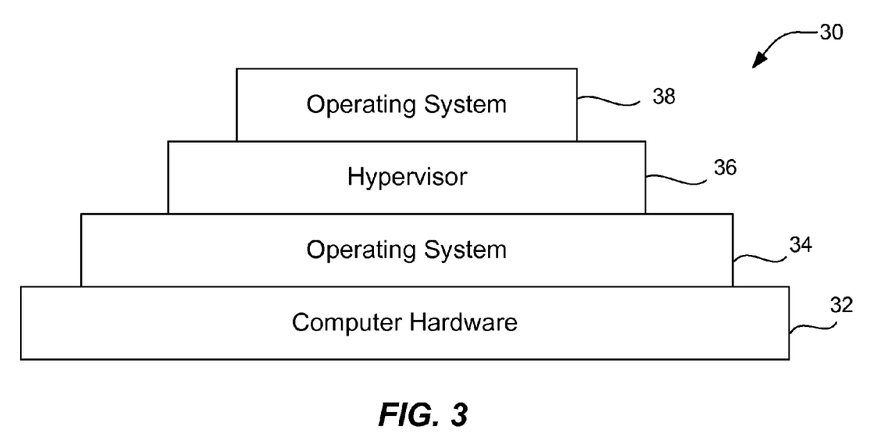
FIG. 3 illustrates yet another computing environment suitable for use with the present invention.

FIG. 3 illustrates yet another computing environment 30 suitable for use with the present invention. Shown is computer hardware 32 upon which is executing an operating system 34. Installed within operating system 34 is hypervisor 36. In this example, a single guest operating system 38 is executing upon a single virtual machine managed by hypervisor 36. Hypervisor 36 is known as a type II (or hosted) hypervisor in that it runs within a conventional operating system environment, rather than directly on the computer hardware. In one embodiment of the invention, hypervisor 36 is the VIRTUALBOX hypervisor available from ORACLE Corporation, or is the VMWARE Workstation hypervisor available from VMWARE, Inc. Operating system 38 may be any suitable operating system used to execute software applications such as the operating systems XP and version 7 available from MICROSOFT Corporation.

Figure 4:
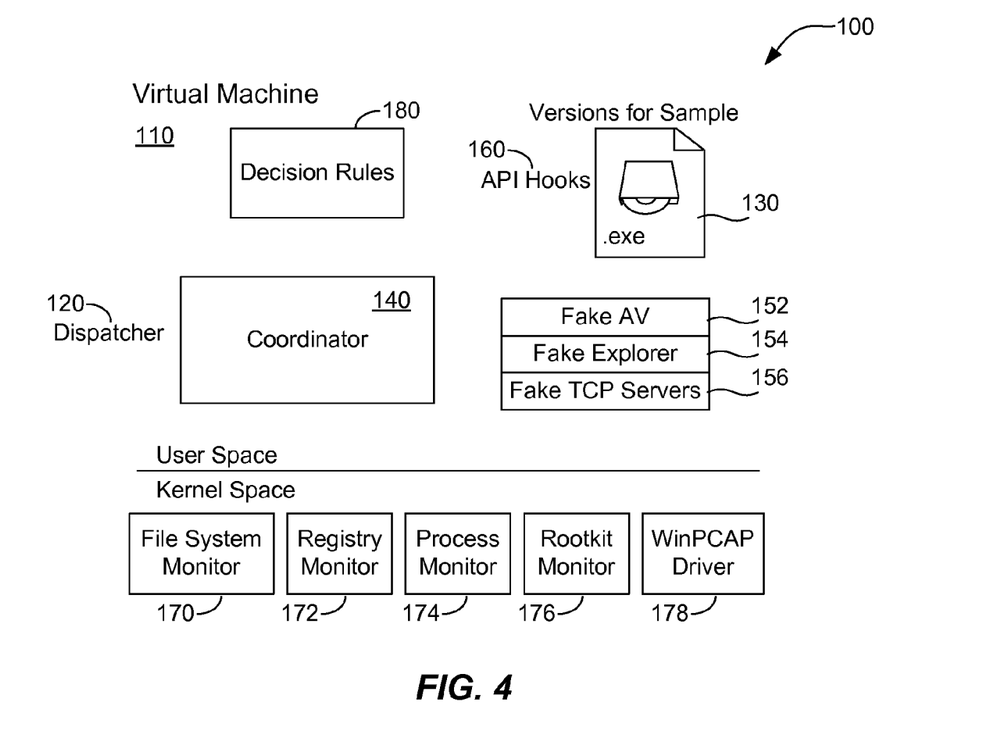
FIG. 4 is a block diagram of an architecture according to one embodiment of the present invention.

FIG. 4 is a block diagram of an architecture 100 according to one embodiment of the present invention. Included is a single virtual machine 110 executing upon a computer, such as may be implemented using any of the embodiments of FIGS. 1-3. In one preferred embodiment, the MICROSOFT operating system XP or version 7 executes upon this virtual machine. Executing within this operating system is a dispatcher software module 120 that accepts input sample files from any hardware appliance or software associated with the computer. In one embodiment, the input sample files for analysis are received from a Threat Discovery Appliance (TDA) which is a hardware appliance available from TREND MICRO Inc. that screens for suspicious files. A user may also submit samples from a TREND MICRO product's user interface or input samples from another product's output, for example, an E-mail gateway product can output an e-mail attachment.

The present invention is applicable to sample files that may execute, be opened, viewed, or are used with a wide variety of software applications. In general, a sample file refers to a file in a particular format for which it is necessary to execute a particular software application in order to view the contents of the sample file or to have the contents of the sample file execute or display information. For example, software applications and their respective sample files may include the following: ACROBAT READER is used to open and view .PDF files; MICROSOFT WORD is used to open and view .DOC files; EXCEL is used to open and view .XLS files; POWERPOINT is used to open and view .PPT files; a JAVA RUNTIME ENVIRONMENT is used to open and execute JAVA applications using .JAR files; the FLASH PLAYER is used to open and execute content contained within .SWF files, .FLV files, and other file formats; the REALPLAYER application opens .RMVB files; etc. Of course, the present invention is not limited to these software applications and their respective file formats, but may include many others as well.

Shown at 130 is an example of any of the versions of a particular software application needed to execute or open a particular sample file. For example, if the sample file is a .DOC file, then version 130 would be the WORD.exe application. Coordinator 140 is a software module arranged to control the life cycle of sample file execution, including: executing the sample files themselves or their associated application program; injecting hooks into executable sample files or into their application program; and collecting various behaviors as the sample files or application programs execute.

Any number of so-called "bait" processes 152-156 may also be executing within the virtual machine in order to attract attacks from any sample files that may be malicious. For example, these processes include one or more fake antivirus programs 152, a fake browser program 154, and any number of fake TCP servers 156. Also, any number of API hooks 160 are injected (during startup) into an executable sample file or into a software application executing a sample file in order to collect any "win32" API calls (using hooking of DLLs). The kernel space of the operating system also includes any number of kernel hooks 170-178 used to collect any kernel level behaviors found during execution of the sample file or of its corresponding application program.

Finally, decision rules 180 is a database of various suspicious behaviors that may occur during execution of the sample file or of its corresponding application program. This database includes registry behaviors (AutoRun registries, sensitive registries, deletion of registries, deceptive registries, added or modified registries, etc.), file behaviors (startup files, sensitive files, dropped files, deceptive files, suspicious name, added or modified files, etc.), process behaviors (added services, terminated processes, deleting self, bypassing a firewall, downloading a file, etc.), and network behaviors (sending e-mail, malicious Web site, port scanning, downloading a file, opening a port and listening, visiting a URL, IRC connection, etc.). These decision rules are used to determine which sample files may be malicious based upon their behaviors. In one embodiment, each particular malicious behavior is given a score and a final score is cumulative of all of the individual scores.

In general, the workflow operates as follows. The dispatcher chooses a sample file for analysis and notifies the coordinator module 140. The coordinator 140 resets all hooks and prepares the bait processes.

If the sample file is a document, then the coordinator prepares the environment for the sample file, installs any number of versions of its corresponding application program, executes these versions and opens the sample file. The coordinator also injects all API hooks and collects behaviors of the application program. These behaviors are matched against the decision rules 180 and a score for the sample file and its corresponding application software version is determined. Further detail on how the workflow operates is described below.

Figure 5:
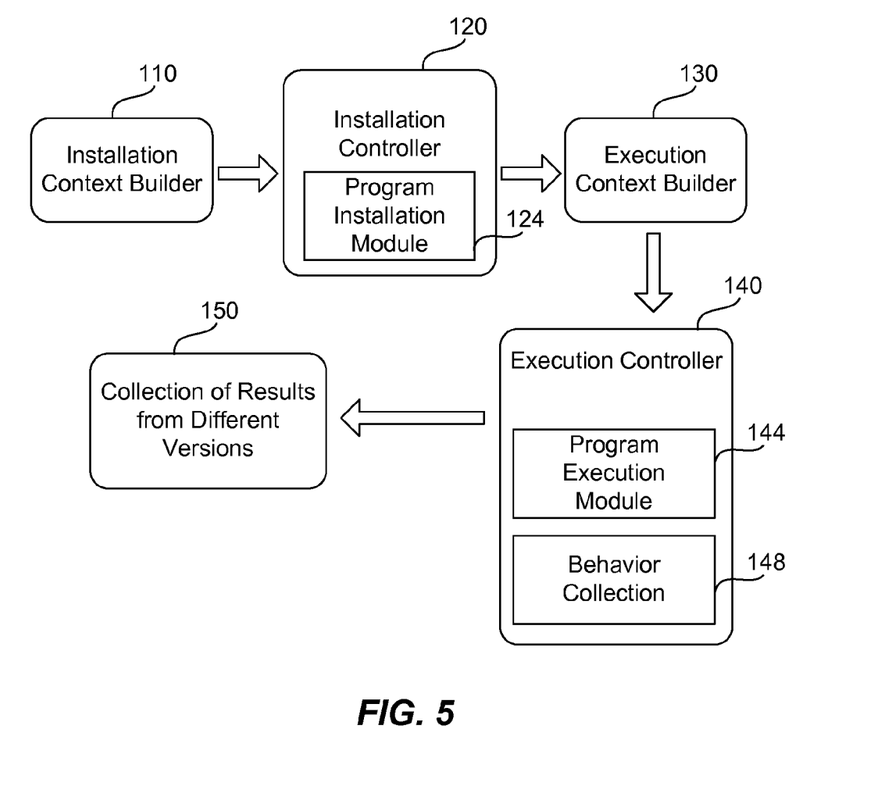
FIG. 5 is a detailed block diagram illustrating the various software modules used to install and execute numerous versions of a particular software application within a single virtual machine.

FIG. 5 is a detailed block diagram illustrating the various software modules used to install and execute numerous versions of a particular software application within a single virtual machine. These modules will be referred to below in the discussion of FIG. 6. In one embodiment, these modules are part of the coordinator software module 140, although implementation of these modules may be performed in other manners. For example, modules 110 and 120 may be implemented as an installation program. Also, the modules may be implemented as part of a larger software application.

Figure 6:
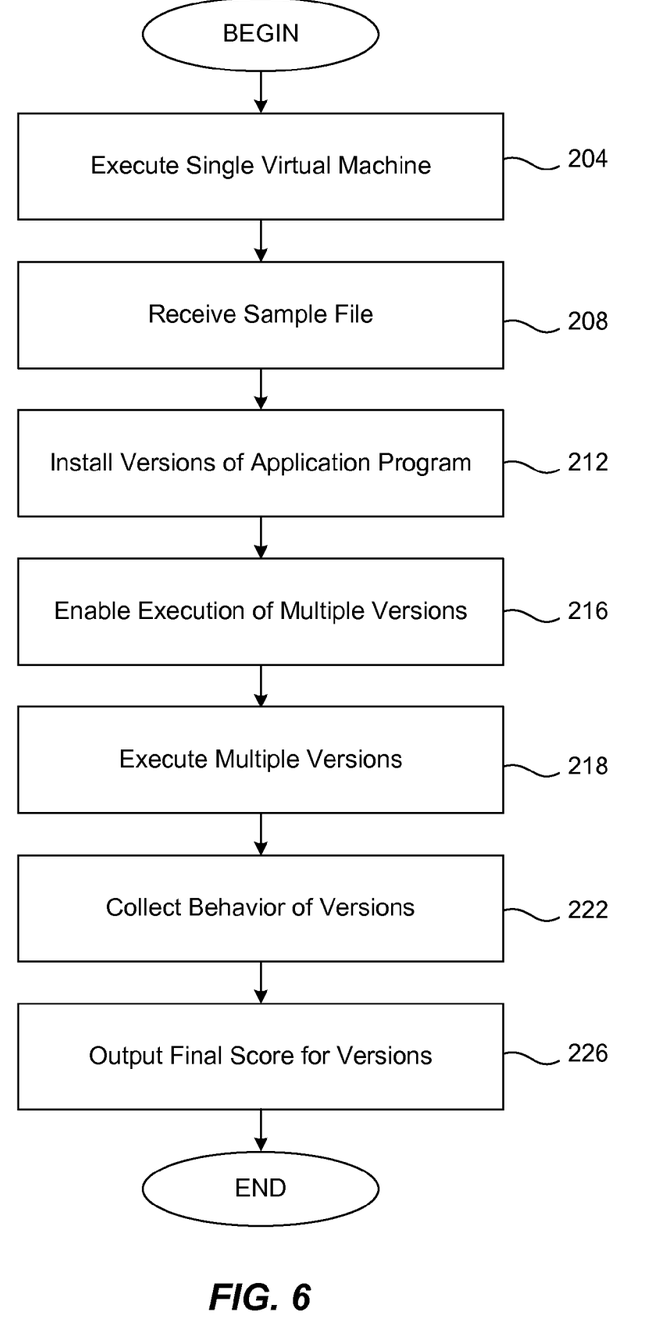
FIG. 6 is a flow diagram describing one embodiment for operation of the present invention.

FIG. 6 is a flow diagram describing one embodiment for operation of the present invention. In step 204 a single virtual machine is executing upon any suitable computer hardware, such as described in previous FIGS. 1-4, and provides the environment and an operating system for the below steps. In step 208 a sample file is received by dispatcher 120 and sent to the coordinator module 140. As mentioned above, the sample file is a so-called "document" file arranged to be opened by a particular application program.

In step 212, any numbers of versions of the particular application program corresponding to the sample file are installed within the virtual machine. For example, if the sample file is a .PDF file, then any number of versions of Adobe Acrobat Reader (such as versions 7, 8 and 9) are installed within the virtual machine. The modules installation builder 110 and installation controller 120 facilitate installation of these versions. As is known in the art, operating systems only allow installation of a single version of an application program at a particular time. For example, if Java 6 is installed first, then installation of Java 7 will replace some of the Java 6 files (e.g., java.exe) in the "windows/system32" directory and will replace some of the registry entries. It would then not be possible to call Java 6 directly in that operating system. In another example, if one installs Acrobat Reader 7 and then installs Acrobat Reader 8, the latter's installation program will automatically uninstall Acrobat Reader 7.

Accordingly, the present invention overcomes these limitations in the prior art by taking steps to allow numerous versions of the same application program to exist at the same time in a single operating system on a single virtual machine. First, a first version of an application program is installed by the installation controller 120. Installation is performed by preferably calling an installation package of the particular application program, e.g., if the sample file is a .DOC file, then controller 120 calls and installation package for Microsoft Word. Program installation module 124 represents a generic installation package for any of the application programs. Secondly, once the first version is installed, the installation context builder then modifies various registry entries and modifies the file system in order to allow a second version of the same application program to be installed.

For example, the installation context builder 110 backs up and hides any registries and files of the first version that might conflict with the second version to be installed. For example, when Adobe Reader version 8 is installed these registry keys for version 7 are hidden: HKEY_LOCAL_MACHINE\SOFTWARBAdobe\Acrobat Reader\7.0. In one implementation, these keys and/or files are removed from the registry and stored in a file on the computer and retrieved when needed. That is, before running version 7 module 130 retrieves and sets the correct registry keys and restores any backed up files so that version 7 will execute correctly. Of course, each software application will have different registry keys and files that may need to be hidden from the operating system; the above is only one example.

Once these registries and files of the first version are hidden from the operating system, it will be possible to install another version of the same application program because the operating system will be unaware that a first version has already been installed. Accordingly, the second version of the application program is then installed as described above. If there are other versions of the application program, then the registry and files of the last version to be installed will be hidden, the next version will be installed, etc. Once the last version of the application program has been installed, its registries and files will also be backed up or hidden. Sometimes different versions of a software application use the same registry and files. For example, JRE version 6 and JRE version 7 both use the file "%windir%/system32/javaw.exe." In this fashion, any number of versions of a particular application program corresponding to the sample file to be analyzed may be installed into the operating system.

In step 216 the invention enables execution of the multiple versions of the same application program either at the same time, or consecutively within the same operating system. In general, the execution context builder 130 prepares an environment for software execution and uses different contexts to isolate versions of an application program from other versions. In general, this step may perform any of the following to allow execution of the multiple versions: modify registry entries (by retrieving stored registry keys, modify files in the file system (by restoring backed up files), hooking of functions, use of user sessions, modify folders, etc. The actual modifications undertaken are dependent upon the particular application program, although, the end result is that the multiple versions may execute consecutively.

Figure 7:
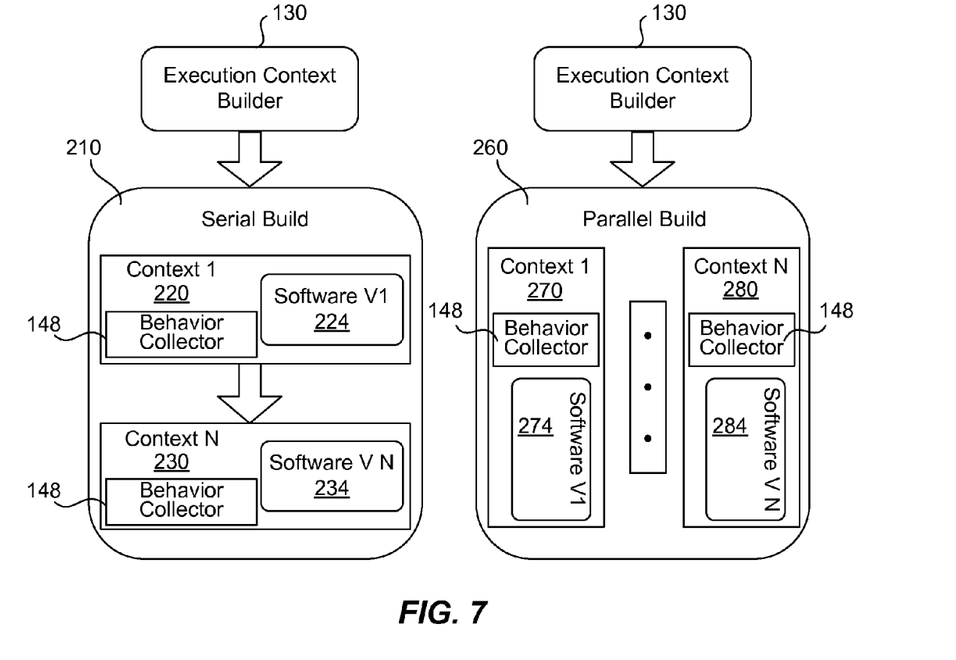
FIG. 7 illustrates different embodiments in which multiple versions are executed.

The context for a particular version may also allow different versions to be executing at the same time; in this embodiment, the context may include: the state of particular registry entries, relevant files needed to execute a version, a Mutex, events and tokens. Mutexes and events are elements that allow for parallel execution of different versions, as shown at 260. Different tokens are created for different versions of applications, and, different versions of applications are executed in different user accounts to allow for parallel execution. The execution context builder 130 may perform its actions before execution controller 140 or in conjunction with controller 140.

One example of enabling the context for a software application to run in parallel with other versions is:
Prepare file: <filename>
Prepare registry: <registry path and data>
Prepare registry for this process by hooking: <registry path and data>
Prepare environment variable: <Environment variable name and value>
Hide mutex to other process by hooking: <Mutex name>
Create new user to execute: <New user name>

For example, if the sample file is a .JAR file, and both Java versions 6 and 7 have been installed, then the operating system will automatically use Java version 7 unless modifications are performed. Accordingly, the execution context builder 130 will hide Java version 7 by replacing or modifying certain files and registry entries in the operating system. Examples of some of these files and registry entries are:
File: C:\WINDOWS\system32\java.exe C:\WINDOWS\system32\javacpl.cpl C:\WINDOWS\system32 \javaw.exe C:\WINDOWS\system32\ javaws.exe
HKEY_CLASSES_ROOT\jarfile\shell\open\command@
HKEY_LOCAL_MACHINE\SOFTWARE\Classes\jarfile\
shell\open\command @
HKEY_LOCAL_MACHINE\SOFTWARE\JavaSoft\Java
Runtime Environment
  CurrentVersion Thus, it will then be possible to execute Java version 6 even though Java version 7 has also been installed in the operating system. When it is necessary to run Java version 7, then these files and registry entries are returned to their original state by module 130.

In another example, if both Acrobat Reader versions 7 and 8 are desired to be executed at the same time, once version 8 is opened it will detect that version 7 has also been opened and it will automatically exit and pop up the version 7 window, unless modifications are performed. Version 8 detects that version 7 is running by reference to a global system object, such as a Mutex. Accordingly, the execution context builder 130 hides this global system object used by version 8 by hooking various APIs for the version 8 process. Another way to execute version 7 and version 8 at the same time is the use of an operating system user session. The execution context builder 130 create a new user session and executes version 8 in the new user session just as if it were executing version 8 in another user's account environment. Thus, using the above techniques, it is possible to execute more than one version of Acrobat Reader at the same time in the same operating system upon a single virtual machine.

In yet another example, if Microsoft Word 2003 is executing and then exits, and then Word 2007 executes, Word 2007 will spend an inordinate amount of time attempting to reconfigure the operating system, unless modifications are performed. Accordingly, the execution context builder 130 modifies the system registry in this situation so that the reconfiguration step is skipped, thus allowing both versions of Microsoft Word to execute consecutively in the same operating system upon a single virtual machine.

In step 218 the execution controller 140 executes multiple versions of an application program. The execution controller may execute each version one after another or may execute all versions in parallel.

FIG. 7 illustrates different embodiments in which multiple versions are executed. Embodiment 210 shows a serial technique in which each version of an application is executed one after another. In this embodiment, execution controller 140 launches program execution module 144 (which is an executable application program such as Acrobat Reader, Microsoft Word, Java, etc.) in order to execute the first version of the application 224 within a first context 220 using the relevant sample file. During execution of this first version, behavior collector 148 collects behavior of the application program and of the sample file. At some point in time, this version is terminated. Next, the execution controller implements the next context for the next version, launches the next version, collects behavior, etc. Finally, the execution controller implements context 230, launches the final version 234, collects behavior, and terminates this version when enough behavior has been collected. In this fashion, versions of a particular application program are executed one after another using the same sample file in order to collect behavior of that sample file with respect to a particular version.

In another example, before installation of Java version 7, module 110 removes and backs up the related files and registry entries of Java version 6. Before running Java version 6, module 130 restores the Java version 6 files and registry entries.

Embodiment 260 shows a parallel technique in which each version of an application is executed at the same time. In this embodiment, execution controller 140 launches a program execution module 144 for each version of the application while the other versions are still executing. A particular version of the software is kept separate from other versions while they are executing in different manners. In one implementation, certain APIs are hooked. For example, registry APIs will check the caller process identifier, and then return different registry values to different processes. In a second implementation, user accounts are used. Different versions of an application are executed in different user accounts, thus using the operating system to separate context information.

During execution of each version, behavior collector 148 collects behavior of each version of the application program and of the sample file. As mentioned above, in step 222 the behavior collector 148 collects behavior of each version of the application program as it executes as well as any behavior of the sample file. The various categories of suspicious behaviors (registry behaviors, file behaviors, process behaviors and network behaviors) have been described above with respect to decision rules 180, and it is these behaviors (and others) that are collected for each version as it executes and a score is assigned to each behavior. For example, in the embodiment 210 of FIG. 7 (serial execution), once software version 224 has finished executing, all the scores for all of the detected behaviors for this version are added together to produce a final score for that version. Likewise, each subsequent software version produces a final score for that version. Typically, behaviors that are benign are assigned a score of zero, while suspicious behaviors may be assigned a score anywhere from one up to twelve. A final report may be issued indicating the final score for each the software versions and an indication as to whether it is suspected that the sample file is malicious based upon the final score generated for each version. For example, a sample file that produces relatively benign behaviors in Acrobat Reader versions 7 and 8 will have a very low final score in each of those versions, but, if that same sample file attempts to exploit any vulnerabilities in Acrobat Reader version 9 (and exhibits suspicious or malicious behaviors in that version), then version 9 will have a high final score with respect to that sample file indicating that the sample file is likely to contain malware.

Similarly, the behavior collector 148 will also collect behavior with respect to each software version executing in embodiment 260 of FIG. 7. The behavior collector will keep track of behaviors in all categories for each software version as it executes (or opens) the sample file, and upon termination of each software version a final score will be produced for that version with respect to the sample file that it has executed or opened. In order to keep separate the scores for each software version, all behaviors are flagged as belonging to different processes or threads. The process and thread activity is monitored, and we obtain the process and thread tree for different versions. We are then able to separate the behaviors for different versions.

In step 226 the coordinator 140 outputs the final score for each of the versions of the application program that have executed with respect to the input sample file. The output may be in the form of a newly created file, output to a printer, a display of information on a computer screen, storage of information in a database, sending of a report over a network connection to another computer, etc. The final score for each version of the application program indicates the extent to which execution of, opening of, or use of, the sample file has indicated that the sample file is malicious with respect to that version of the application program.

Computer System Embodiment

Figure 8A:
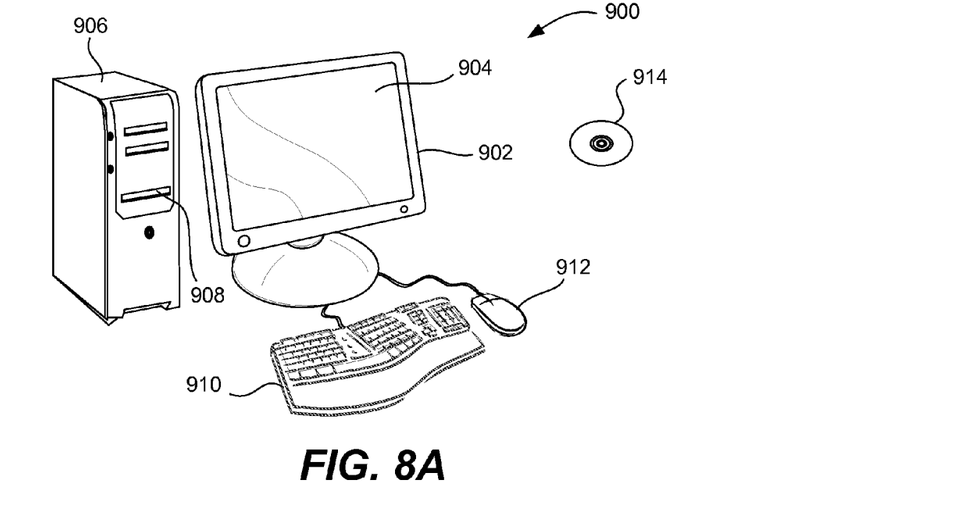
FIGS. 8A and 8B illustrate a computer system suitable for implementing embodiments of the present invention.
Figure 8B:
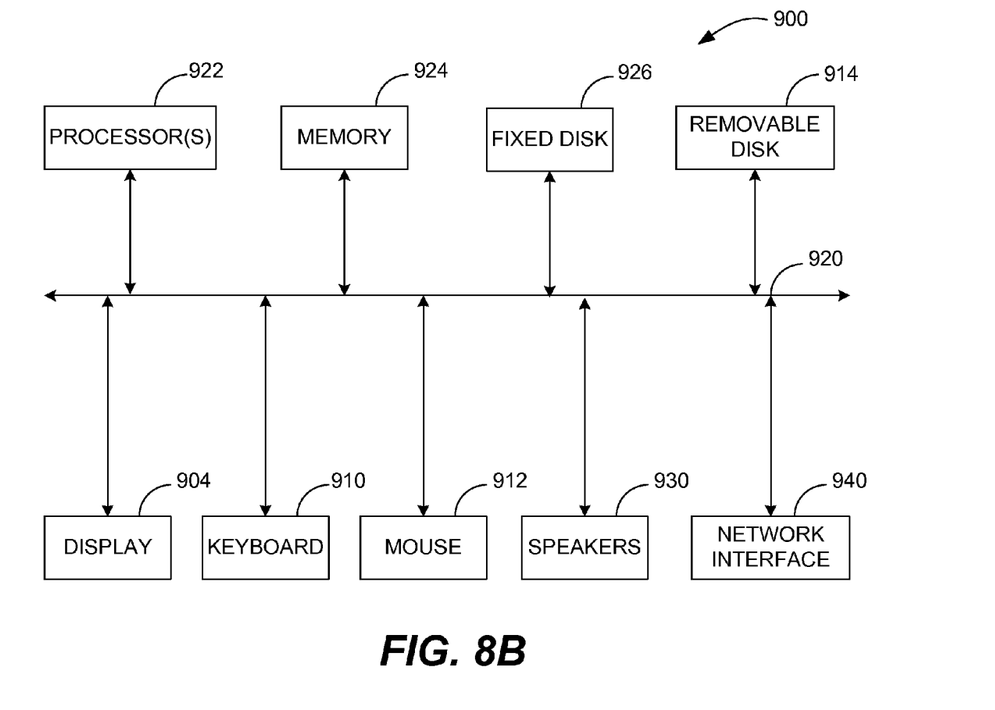

FIGS. 8A and 8B illustrate a computer system 900 suitable for implementing embodiments of the present invention. FIG. 8A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 8B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM are used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of detecting malware, said method comprising:
   executing a single virtual machine on a computer;
   executing a single operating system within said virtual machine;
   receiving a sample file within said operating system, said sample file suspected of containing malware;
   installing a plurality of versions of an application program that is able to open said sample file within said operating system, said versions all being in an installed state at the same time;
   executing said plurality of versions of said application program within said operating system while said versions of said application program are in an installed state at the same time;
   executing one of said versions by hooking a registry API in order to return a different registry value to different versions that call said registry API;
   each of said plurality of versions opening said sample file; and
   recording registry behaviors, file behaviors, process behaviors and network behaviors of each of said versions after said opening of said sample file.

2. The method as recited in claim 1 further comprising:
   hiding, from said operating system, at least one registry entry corresponding to one of said versions of said application program to allow other of said versions of said application program to be installed.

3. The method as recited in claim 1 further comprising:
   modifying information of said operating system regarding one of said executing versions of said application program to allow other of said versions of said application program to begin executing.

4. The method as recited in claim 1 wherein said virtual machine is implemented within a hypervisor.

5. The method as recited in claim 1 further comprising:
   saving a context associated with one of said versions; and
   retrieving said context in order to execute said one of said versions.

6. The method as recited in claim 1 further comprising:
   hiding, from said operating system, at least one registry entry and at least one file corresponding to each of said versions of said application program after said one version is installed, and before a subsequent version of said application program is installed, to allow said subsequent version to be installed.

7. The method as recited in claim 1 further comprising:
   retrieving, from storage on said computer, at least one registry entry and at least one file corresponding to each of said versions of said application program in order to allow each of said versions to execute within said operating system.

8. The method as recited in claim 1 further comprising:
hiding at least one registry and at least one file of a first one of said versions in order to allow a second one of said versions to be installed; and
retrieving said one registry and said one file of said first version after said installing in order to execute said first version.

9. A method of detecting malware, said method comprising:
executing a single virtual machine on a computer;
executing a single operating system within said virtual machine;
receiving a sample file within said operating system, said sample file suspected of containing malware;
installing a plurality of versions of an application program that is able to open said sample file within said operating system, said versions all being in an installed state at the same time;
modifying at least one file and at least one registry entry of said operating system in order to hide one of said versions from said operating system so that another of said versions may execute;
executing serially said versions of said application program within said operating system, each of said versions terminating before a next version begins executing;
each of said plurality of versions opening said sample file; and
recording registry behaviors, file behaviors, process behaviors and network behaviors of each of said versions after opening of said sample file.

10. The method as recited in claim 9 further comprising:
hiding, from said operating system, at least one registry entry corresponding to one of said versions of said application program to allow other of said versions of said application program to be installed.

11. The method as recited in claim 9 further comprising:
modifying information of said operating system regarding one of said executing versions of said application program to allow other of said versions of said application program to begin executing.

12. The method as recited in claim 9 wherein said virtual machine is implemented within a hypervisor.

13. The method as recited in claim 9 further comprising:
saving a context associated with one of said versions; and
retrieving said context in order to execute said one of said versions.

14. The method as recited in claim 9 further comprising:
for each of said versions, retrieving, from storage on said computer, at least one registry entry and at least one file corresponding to each of said versions in order to allow each of said versions to execute within said operating system.

15. The method as recited in claim 9 further comprising:
modifying a system registry of said operating system in order to skip a reconfiguration step so that said versions may execute serially.

16. A method of detecting malware, said method comprising:
executing a single virtual machine on a computer;
executing a single operating system within said virtual machine;
receiving a sample file within said operating system, said sample file suspected of containing malware;
installing a plurality of versions of an application program that is able to open said sample file within said operating system, said versions all being in an installed state at the same time;
executing in parallel said versions of said application program within said operating system while said versions of said application program are in an installed state at the same time, each of said versions executing concurrently;
executing one of said versions by hooking a plurality of APIs used by said one version and by hiding a global system object used by said one version to detect that another of said versions is executing;
each of said executing versions opening said sample file; and
recording registry behaviors, file behaviors, process behaviors and network behaviors of each of said versions after said opening of said sample file.

17. The method as recited in claim 16 further comprising:
hiding, from said operating system, at least one registry entry corresponding to one of said versions of said application program to allow other of said versions of said application program to be installed.

18. The method as recited in claim 16 further comprising:
modifying information of said operating system regarding one of said executing versions of said application program to allow other of said versions of said application program to begin executing.

19. The method as recited in claim 16 wherein said virtual machine is one of a plurality of virtual machines implemented upon said computer.

20. The method as recited in claim 16 further comprising:
saving a context associated with one of said versions; and
retrieving said context in order to execute said one of said versions.

21. The method as recited in claim 16 further comprising:
executing each of said versions in a different user session.

22. A method of detecting malware, said method comprising:
executing a single virtual machine on a computer;
executing a single operating system within said virtual machine;
receiving a sample file within said operating system, said sample file suspected of containing malware;
installing a plurality of versions of an application program that is able to open said sample file within said operating system, said versions all being in an installed state at the same time;
executing in parallel said versions of said application program within said operating system while said versions of said application program are in an installed state at the same time, each of said versions executing concurrently;
executing one of said versions by hooking a registry API in order to return a different registry value to different versions that call said registry API;
each of said executing versions opening said sample file; and
recording registry behaviors, file behaviors, process behaviors and network behaviors of each of said versions after said opening of said sample file.

* * * * *